United States Patent [19]

Trementozzi

[11] 4,360,618
[45] Nov. 23, 1982

[54] LOW ACRYLONITRILE CONTENT STYRENE-ACRYLONITRILE POLYMERS BLENDED WITH POLYPHENYLENE OXIDE

[75] Inventor: Quirino A. Trementozzi, Springfield, Mass.

[73] Assignee: Monsanto Company, St. Louis, Mo.

[21] Appl. No.: 322,803

[22] Filed: Nov. 19, 1981

[51] Int. Cl.$^3$ .................. C08K 5/52; C08L 25/10; C08L 25/12
[52] U.S. Cl. ................... 524/141; 524/143; 525/68; 525/132; 525/152
[58] Field of Search ............ 524/141, 143; 525/68, 525/132, 152

[56] References Cited
U.S. PATENT DOCUMENTS 3,383,435  5/1968  Cizek ............................. 525/152
3,660,531  5/1972  Lauchlan et al. ............... 525/152
3,833,688  9/1974  Abolins et al. .................. 525/68
3,883,613  5/1975  Cooper ............................ 525/68
3,981,841  9/1976  Abolins et al. .................. 525/68
3,983,090  9/1976  Abolins et al. .................. 525/68
4,077,934  3/1978  Lee, Jr. .......................... 525/132
4,131,598  12/1978 Abolins et al. ................. 525/152
4,309,513  1/1982  Ueno et al. ..................... 525/132
4,327,012  4/1982  Salee ............................. 525/132

Primary Examiner—John Kight, III
Assistant Examiner—R. A. White
Attorney, Agent, or Firm—Michael J. Murphy

[57] ABSTRACT

Polyphenylene oxide blended with SAN or ABS polymers containing from 2 to 8% by weight of acrylonitrile have highly advantageous combination of strength and distortion temperature.

6 Claims, No Drawings

LOW ACRYLONITRILE CONTENT STYRENE-ACRYLONITRILE POLYMERS BLENDED WITH POLYPHENYLENE OXIDE

BACKGROUND OF THE INVENTION

This invention relates to polyblends and specifically to polyblends of polyphenylene oxide with specific rubber modified styrene/acrylonitrile copolymers. These polyblends are particularly useful as they combine excellent impact strength and heat distortion temperature.

DISCUSSION OF THE PRIOR ART

Blends of polyphenylene oxide with styrenic polymers are broadly described in U.S. Pat. No. 3,383,435. The patent describes blends incorporating into a polyphenylene oxide one or more of homopolystyrene (PS), styrene/acrylonitrile/butadiene polymers (ABS) and rubber-modified (or high impact) polystyrene (HIPS).

In general, however, commercial interest has focussed on blends with HIPS because these prove to have physical characteristics that make them particularly suitable for the manufacture of molded parts. Blends with AN-containing polymers such as SAN and ABS have not in general been favored since compatibility problems have been encountered resulting in properties falling well below what might be expected or indeed commercially acceptable.

The present invention provides novel polyblends of polyphenylene oxide with specified styrenic polymers which have properties that unexpectedly far surpass what might be anticipated on the basis of the known art. The blends have excellent combinations of heat distortion temperature and impact strength and are most attractive for a wide variety of applications.

DESCRIPTION OF THE INVENTION

The present invention provides a polyblend comprising:

A. from 10 to 15% by weight of a polyphenylene oxide; and
B. from 90 to 25% by weight of a polymer comprising from 2 to 8% by weight of an unsaturated nitrile monomer, from 72 to 98% by weight of a vinyl aromatic monomer and from 0 to 20% by weight of a rubber having a glass transition temperature below 0° C.

Where Component B contains a rubber the polymer usually has two components: a matrix copolymer of the vinylaromatic and nitrile monomers and a dispersed phase comprising rubber particles, usually grafted with the matrix monomers in the ratio in which they appear in the matrix polymer. Such polymers belong to the family of ABS polymers and it is a preferred feaure of this invention that Component B is an ABS polymer.

The rubber component of the preferred Component B polymers has a glass transition temperature below 0° C. and preferably below −30° C. It may be provided by polymers comprising at least 60% of a diene monomer such as butadiene, isoprene, chloroprene and the like with optional copolymerizable monomers such as a vinylaromatic monomer or an unsaturated nitrile. Alternatively, other rubbers such as acrylate, EPDM and polypentenamer rubbers may be employed.

The vinylaromatic monomer is usually styrene but this can be replaced in whole or in part by other related monomers such as α-methylstyrene, p-methylstyrene, chlorostyrene and other halostyrenes, o-ethylstyrene and the like. Styrene is, however, the preferred monomer and this is used in the following description, wherever the context permits, to represent the above group of vinylaromatic monomers.

The unsaturated nitrile monomer is preferably acrylonitrile but this too can be replaced in whole or in part by a related nitrile such as methacrylonitrile. However, this group will be represented in what follows, as far as context allows, by acrylonitrile.

The polyphenylene oxide (Component A) is a self-condensation product of a monohydric monocyclic phenol conventionally produced by reacting the phenol with oxygen in the presence of a complex copper catalyst. In general, molecular weight can be controlled by catalyst concentration, solvent/non-solvent ratios, and reaction time, longer times providing a higher average number of repeating units.

A preferred family of polyphenylene oxides has repeating structural units of the formula:

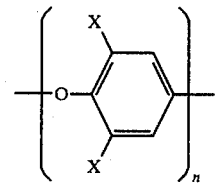

wherein the oxygen atom of one unit is connected to the benzene nucleus of the next adjoining unit, n is a positive integer and is at least 50, and each X is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Illustrative members are: poly(2,6-dilauryl 1,4-phenylene)oxide; poly(2,6-diphenyl-1,4-phenylene)oxide; poly(2,6-dimethoxy-1,4-phenylene)oxide; poly(2,6-diethoxy-1,4-phenylene)oxide; poly(2-methoxy-6-ethoxy-1,4-phenylene)oxide; poly(2-ethyl-6-stearyloxy-1,4-phenylene)oxide; poly(2,6-dichloro-1,4-phenylene)oxide; poly(2-methyl-6-phenyl-1,4-phenylene)oxide; poly(2,6-dibenzyl-1,4-phenylene)oxide; poly(2-ethoxy-1,4-phenylene)oxide; poly(2-chloro-1,4-phenylene)oxide; poly(2,5-dibromo-1,4-phenylene)oxide; and the like. Also included under the heading of polyphenylene oxides are copolymers derived from condensation of mixed phenols such as 2,6-dimethyl phenol and 2,3,6-trimethyl phenol.

For purposes of the present invention an especially preferred family of polyphenylene ethers include those having alkyl substitution in the two positions ortho to the oxygen ether atom, i.e., those of the above formula wherein each X is alkyl, most preferably having from 1 to 4 carbon atoms. Illustrative members of this class are: poly(2,6-dimethyl-1,4-phenylene)oxide; poly(2,6-diethyl-1,4-phenylene)oxide; poly(2-methyl-6-ethyl-1,4-phenylene)oxide; poly(2-methyl-6-propyl-1,4-phenylene)oxide; poly(2,6-dipropyl-1,4-phenylene)oxide; poly(2-ethyl-6-propyl-1,4-phenylene)oxide; and the like.

The most preferred polyphenylene oxide resin for purposes of the present invention is poly(2,6-dimethyl-1,4-phenylene)oxide.

In preferred polyblends according to the invention the relative weight porportions of "A" and "B" are from 30:70 to 70:30 respectively. The amount of acrylonitrile in "B" is preferably from 2.5 to 7.5% by weight.

In addition to Components A and B the polyblend can comprise up to 40% by weight based on Components A and B of additional polymeric components conferring improved properties such as a block copolymer diene rubber or an acrylate/styrene/butadiene polymer (such as Acryloid XM-611 from Rohm and Haas) to improve impact strength, or a ure. The polyblend can also include plasticizers and flow aids to improve processability; stabilizers and antioxidants to protect against polymer degradation; and fire retardants where required for the proposed end-use. It is especially preferred that the polyblend comprises certain phosphate esters capable of serving to improve melt flow and, at a high enough concentration, a degree of flame retardance. Typical of such esters are triaryl phosphates such as triphenyl phosphate and tricresylphosphate and alkenyl/aryl phosphates. Other known additives such as particulate or fibrous fillers, dyes, pigments, anti- static additives and the like can be added as required.

The advantages of the polyblends of the present invention over those of the prior art are more completely explained below.

DESCRIPTION OF THE PREFERRED EMBODIMENTS

To illustrate the unexpected and advantageous properties obtained from the polyblends of the invention several ABS polymers were produced wth varying amounts of acrylonitrile. In each case the amount of rubber was held essentially constant.

The polymers were obtained by mass polymerization of styrene and acrylonitrile monomers in the presence of the rubber (a polybutadiene sold by Firestone Co. as Diene 35) under essentially similar conditions.

Each sample was then Brabender blended in 50/50 weight proportions with a commercial poly(2,6-dimethylphenol).

Each blend was then tested for its Izod Impact Strength (using ASTM D-256) and Distortion Temperature Under Load or DTUL (using ASTM D-648) on compression molded samples. In addition, further samples of the same polymers were extrusion blended and injection molded samples thereof were tested for Izod Impact Strength and DTUL (using the same ASTM procedure); Tensile Yield (ASTM D-638) Tensile Fail (ASTM D-638); Percentage Elongation at Fail (ATM D-638); and tensile modulus (ASTM D-638).

The polyblend formulations and their properties are set forth in Table 1 below.

TABLE 1

|  | Comparative | Invention | | | Comparative | | | |
|---|---|---|---|---|---|---|---|---|
|  |  | Ex. 1 | Ex. 2 | Ex. 3 | Ex. 4 | Ex. 5 | Ex. 6 | Ex. 7 |
| Formulation | | | | | | | | |
| PPO[1] | 50 | 50 | 50 | 50 | 50 | 50 | 50 | 50 |
| ABS | 50 | 50 | 50 | 50 | 50 | 50 | 50 | 50 |
| % AN[2] | 0 | 2.7 | 5.1 | 7.3 | 8.5 | 9.4 | 12.2 | 27 |
| % Rubber[2] | 9.8 | 12.9 | 13.6 | 12.6 | 13.3 | 12.6 | 12.6 | 12.0 |
| Properties | | | | | | | | |
| Compression Molded | | | | | | | | |
| Izod (Joules/meter notch) | 172.8–183.6 | 248.4 | 205.2 | 210.6 | 75.6 | 37.8 | 27.0 | 21.6 |
| DTUL (°C.) | 121 | 118 | 124 | 116 | 101 | 94 | 90 | 90 |
| Injection Molded | | | | | | | | |
| Tensile (Yield) (MPa) | 53.13 | 56.6 | 56.6 | 55.2 | — | — | — | — |
| Tensile (Fail) (NPa) | 44.2 | 46.9 | 47.6 | 54.4 | — | — | — | — |
| DTUL (°C.) | 121 | 120 | 118 | 119 | — | — | — | — |
| Modulus (MPa) | 5200 | 5400 | 5500 | 4851 | — | — | — | — |
| Izod (Joules/meter notch) | 189 | 226.8 | 226.8 | 194.4 | — | — | — | — |

[1]Poly (2,6-dimethyl phenol) condensation product.
[2]Based on the ABS Polymer.

As can clearly be seen from the above Examples incorporation of an ABS with a low acrylonitrile content between about 2 and 8% based on the ABS weights results is a spectacular improvement in impact strength at a comparatively minor sacrifice in DTUL when compared with the "comparative" example which is essentially HIPS plus PPO. When compared to a conventional ABS/PPO blend (Example 7) the improvement is truly astonishing.

While not wishing to be bound by theory it would appear that increasing AN content leads to incompatibility and that where the AN level is from about 2 to 8% of the ABS polymer weight this tendency is not at an intolerable level. It further appears that this level allows the advantages of improved impact and tensile strengths and organic solvent resistance, attributable to the presence of the acrylonitrile, to be clearly demonstrated.

The above Examples are for the purposes of illustration of the advantages of the invention and are not intended to imply any limitation on the essential scope thereof. It is foreseen that many minor variations, modifications and additions known in the art could be made without departing from the essential elements of the invention. It is intended that all such variations, modifications and additions be embraced within the purview of this invention.

What is claimed is:

1. A polyblend comprising:
   A. from 10 to 90% by weight of a polyphenylene oxide; and
   B. from 90 to 10% by weight of a polymer comprising:
   from 2 to 8% by weight of an unsaturated nitrile monomer;
   from 72 to 98% by weight of a vinylaromatic monomer; and
   from 0 to 20% by weight of a rubber having a glass transition temperature below 0° C.

2. A polyblend according to claim 1 in which the polyphenylene oxide is a self-condensation polymer of 2,6-dimethylphenol.

3. A polyblend according to claim 1 in which the Component B is selected from the group consisting of acrylonitrile/butadiene/styrene copolymers and styrene/acrylonitrile copolymers.

4. A polyblend according to any one of claims 1 to 3 in which the weight proportions of Components A and B are from 30:70 to 70:30.

5. A polyblend according to any one of claims 1 to 3 that comprises a triaryl phosphate.

6. A polyblend according to claim 1 that also comprises up to 40% based on the combined weights of Components A and B of a polymer of styrene and maleic anhydride comprising from 5 to 30% by weight of maleic anhydride.

* * * * *